(12) United States Patent
Han et al.

(10) Patent No.: US 11,867,556 B2
(45) Date of Patent: Jan. 9, 2024

(54) SPECTROMETER INCLUDING METASURFACE

(71) Applicants: SAMSUNG ELECTRONICS CO., LTD., Suwon-si (KR); CALIFORNIA INSTITUTE OF TECHNOLOGY, Pasadena, CA (US)

(72) Inventors: Seunghoon Han, Seoul (KR); Amir Arbabi, Pasadena, CA (US); Andrei Faraon, Pasadena, CA (US); Ehsan Arbabi, Pasadena, CA (US)

(73) Assignees: SAMSUNG ELECTRONICS CO., LTD., Suwon-si (KR); CALIFORNIA INSTITUTE OF TECHNOLOGY, Pasadena, CA (US)

(*) Notice: Subject to any disclaimer, the term of this patent is extended or adjusted under 35 U.S.C. 154(b) by 74 days.

(21) Appl. No.: 17/486,326

(22) Filed: Sep. 27, 2021

(65) Prior Publication Data

US 2022/0011161 A1 Jan. 13, 2022

Related U.S. Application Data

(63) Continuation of application No. 16/692,776, filed on Nov. 22, 2019, now Pat. No. 11,162,841, which is a
(Continued)

(30) Foreign Application Priority Data

Apr. 14, 2016 (KR) ........................ 10-2016-0045802

(51) Int. Cl.
*G01J 3/02* (2006.01)
*G01J 3/28* (2006.01)
(Continued)

(52) U.S. Cl.
CPC ........... *G01J 3/0208* (2013.01); *G01J 3/0205* (2013.01); *G01J 3/0224* (2013.01); *G01J 3/0256* (2013.01);
(Continued)

(58) Field of Classification Search
CPC ...... G01J 3/0208; G01J 3/0205; G01J 3/0224; G01J 3/0256; G01J 3/0259; G01J 3/2803; G01J 3/447; G01J 3/1804; B82Y 20/00
See application file for complete search history.

(56) References Cited

U.S. PATENT DOCUMENTS 4,468,122 A * 8/1984 Puryaev ............ G01B 9/02039
356/513
4,943,716 A 7/1990 Ichikawa et al.
(Continued)

FOREIGN PATENT DOCUMENTS

WO 2014/001074 A1 1/2014

OTHER PUBLICATIONS

Communication dated Jan. 5, 2023 by the Korean Intellectual Property Office in Korean Patent Application No. 10-2016-0045802.
(Continued)

*Primary Examiner* — Mohamed K Amara
(74) *Attorney, Agent, or Firm* — Sughrue Mion, PLLC

(57) ABSTRACT

A spectrometer includes a transparent substrate including a first surface and a second surface that face each other and are substantially parallel to each other; a slit provided on the first surface and through which light is incident onto the transparent substrate; a spectrum optical system including metasurface including a plurality of nanostructures that are two-dimensionally arranged and satisfy a sub-wavelength scattering condition, wherein the metasurface includes a focusing metasurface which includes first nanostructures of
(Continued)

the plurality of nanostructures, and is configured to reflect, disperse, and focus the light incident thereon through the slit, at different angles based on respective wavelengths; and a sensor configured to receive the light from the focusing metasurface. When L is a total length of an optical path from the slit to the sensor and D is a thickness of the transparent substrate, L and D satisfy the following inequality: $L/D > 3$.

13 Claims, 14 Drawing Sheets

Related U.S. Application Data continuation of application No. 15/221,184, filed on Jul. 27, 2016, now Pat. No. 10,514,296.

(60) Provisional application No. 62/198,337, filed on Jul. 29, 2015.

(51) Int. Cl.
  *G01J 3/447* (2006.01)
  *B82Y 20/00* (2011.01)

(52) U.S. Cl.
  CPC .......... *G01J 3/0259* (2013.01); *G01J 3/2803* (2013.01); *G01J 3/447* (2013.01); *B82Y 20/00* (2013.01)

(56) References Cited

U.S. PATENT DOCUMENTS

| | | | |
|---|---|---|---|
| 5,623,473 A | 4/1997 | Ichihara | |
| 5,815,278 A * | 9/1998 | Johnston | G01N 21/553 385/12 |
| 6,208,440 B1 | 3/2001 | Jang | |
| 6,249,346 B1 | 6/2001 | Chen et al. | |
| 6,303,934 B1 | 10/2001 | Daly et al. | |
| 6,587,198 B2 * | 7/2003 | Olshausen | G01J 3/0208 356/328 |
| 6,657,723 B2 * | 12/2003 | Cohen | G02B 6/4215 385/14 |
| 6,862,092 B1 | 3/2005 | Ibsen et al. | |
| 6,886,953 B2 * | 5/2005 | Cook | G01J 3/0208 359/861 |
| 6,891,152 B2 * | 5/2005 | Averbukh | B82Y 10/00 250/251 |
| 6,980,295 B2 | 12/2005 | Lerner | |
| 6,985,226 B2 * | 1/2006 | Lerner | G01J 3/02 356/328 |
| 7,041,979 B2 | 5/2006 | Chrisp | |
| 7,075,082 B2 * | 7/2006 | Tsao | G01J 3/02 250/339.08 |
| 7,148,488 B2 * | 12/2006 | Horton | G01N 21/33 356/326 |
| 7,161,673 B2 * | 1/2007 | Da Silva | G01J 3/36 356/330 |
| 7,180,590 B2 * | 2/2007 | Bastue | G01J 3/02 359/569 |
| 7,239,386 B2 * | 7/2007 | Chrisp | G01J 3/2823 356/328 |
| 7,330,258 B2 * | 2/2008 | Warren | G01J 3/0208 356/328 |
| 7,483,127 B1 | 1/2009 | Li | |
| 7,609,607 B2 | 10/2009 | Kim | |
| 7,688,700 B2 | 3/2010 | Ooi et al. | |
| 7,817,274 B2 * | 10/2010 | Zhang | G01J 3/0256 356/328 |
| 7,864,317 B2 | 1/2011 | Bockstaele et al. | |
| 8,174,695 B2 | 5/2012 | Choi et al. | |
| 8,345,226 B2 | 1/2013 | Zhang | |
| 8,390,806 B1 | 3/2013 | Subramanian | |
| 8,456,620 B2 | 6/2013 | Kruglick | |
| 8,519,325 B1 | 8/2013 | Lu et al. | |
| 8,861,060 B2 * | 10/2014 | Puegner | G01J 3/0256 359/209.1 |
| 8,937,717 B2 | 1/2015 | Preston | |
| 8,993,307 B2 * | 3/2015 | Zaccarin | G02B 6/12002 435/283.1 |
| 9,435,689 B2 * | 9/2016 | Comstock | G01J 3/2823 |
| 9,625,317 B2 * | 4/2017 | Correns | G01J 3/2823 |
| 9,684,171 B2 * | 6/2017 | Border | G02B 5/003 |
| 10,084,239 B2 | 9/2018 | Shaver et al. | |
| 10,514,296 B2 * | 12/2019 | Han | G01J 3/0224 |
| 10,566,169 B1 * | 2/2020 | Bennahmias | H01J 49/34 |
| 11,155,007 B2 * | 10/2021 | Hofmeister | C08G 77/04 |
| 11,162,841 B2 * | 11/2021 | Han | G01J 3/2803 |
| 11,268,854 B2 * | 3/2022 | Han | G01J 3/027 |
| 2002/0060792 A1 | 5/2002 | Ibsen et al. | |
| 2003/0223325 A1 | 12/2003 | Shimano et al. | |
| 2004/0227950 A1 | 11/2004 | Hill | |
| 2005/0088593 A1 | 4/2005 | Yamauchi | |
| 2006/0038994 A1 | 2/2006 | Chrisp et al. | |
| 2006/0219676 A1 | 10/2006 | Taylor et al. | |
| 2006/0268269 A1 | 11/2006 | Warren | |
| 2007/0262405 A1 | 11/2007 | Furuyama | |
| 2008/0088524 A1 | 4/2008 | Wang et al. | |
| 2008/0165079 A1 | 7/2008 | Smith et al. | |
| 2009/0268268 A1 | 10/2009 | Tanaka et al. | |
| 2010/0039643 A1 | 2/2010 | Park et al. | |
| 2010/0149073 A1 * | 6/2010 | Chaum | G02B 27/017 345/8 |
| 2010/0227200 A1 | 9/2010 | Miyata et al. | |
| 2011/0019180 A1 | 1/2011 | Kruglick | |
| 2011/0073149 A1 * | 3/2011 | Ladner | F24S 23/74 703/2 |
| 2012/0200909 A1 | 8/2012 | Johnson | |
| 2012/0236382 A1 | 9/2012 | Puegner et al. | |
| 2012/0300301 A1 | 11/2012 | Ando et al. | |
| 2013/0271759 A1 | 10/2013 | Fattal et al. | |
| 2014/0055845 A1 | 2/2014 | Jain | |
| 2014/0118738 A1 | 5/2014 | Comstock, II et al. | |
| 2014/0264029 A1 | 9/2014 | Tomioka | |
| 2015/0116721 A1 | 4/2015 | Kats et al. | |
| 2015/0162658 A1 | 6/2015 | Bowers et al. | |
| 2015/0241277 A1 | 8/2015 | Correns et al. | |
| 2015/0288129 A1 | 10/2015 | Jain | |
| 2015/0300876 A1 | 10/2015 | Acher et al. | |
| 2016/0099701 A1 | 4/2016 | Rinaldi et al. | |
| 2016/0126381 A1 | 5/2016 | Wang et al. | |
| 2016/0158886 A1 | 6/2016 | Kumar et al. | |
| 2016/0178983 A1 | 6/2016 | Alloatti et al. | |
| 2016/0245693 A1 | 8/2016 | Perez Calero et al. | |
| 2016/0266392 A1 | 9/2016 | Arnold | |
| 2016/0277117 A1 | 9/2016 | Zheng et al. | |
| 2016/0299337 A1 | 10/2016 | Arbabi et al. | |
| 2017/0003169 A1 | 1/2017 | Shaltout et al. | |
| 2017/0030773 A1 * | 2/2017 | Han | G01J 3/0205 |
| 2017/0082263 A1 | 3/2017 | Byrnes et al. | |
| 2017/0176689 A1 | 6/2017 | Popp | |
| 2017/0194522 A1 | 7/2017 | Wang et al. | |
| 2017/0201658 A1 | 7/2017 | Rosenblatt et al. | |
| 2017/0219739 A1 | 8/2017 | Lin et al. | |
| 2017/0322457 A1 | 11/2017 | Chanda et al. | |
| 2017/0346257 A1 | 11/2017 | Garnache-Creuillot et al. | |
| 2017/0370773 A1 | 12/2017 | Kim et al. | |
| 2018/0045953 A1 | 2/2018 | Fan et al. | |
| 2018/0059440 A1 | 3/2018 | Yu et al. | |
| 2018/0156949 A1 | 6/2018 | Tsai et al. | |
| 2018/0178571 A1 | 6/2018 | Zhu et al. | |
| 2018/0202918 A1 | 7/2018 | Tanaka et al. | |
| 2018/0231702 A1 | 8/2018 | Lin et al. | |
| 2018/0240653 A1 | 8/2018 | Akselrod et al. | |
| 2018/0246262 A1 | 8/2018 | Zhan et al. | |
| 2018/0252857 A1 | 9/2018 | Glik et al. | |
| 2018/0274750 A1 | 9/2018 | Byrnes et al. | |
| 2019/0178714 A1 * | 6/2019 | Faraji-Dana | G01J 3/0259 |
| 2019/0369401 A1 | 12/2019 | Rolland | G02B 27/0176 |
| 2020/0256725 A1 * | 8/2020 | Han | G01J 3/0256 |
| 2020/0363323 A1 * | 11/2020 | Quaranta | G01J 3/0208 |

(56) References Cited

U.S. PATENT DOCUMENTS

OTHER PUBLICATIONS

Amir Arbabi et al., "Complete Control of Polarization and Phase of Light with High Efficiency and Sub-wavelength Spatial Resolution", Nov. 2014, arXiv:1411.1494v1 [physics.optics] (10 Pages Total).

Amir Arbabi et al., "Subwavelength-thick Lenses with High Numerical Apertures and Large Efficiency Based on High Contrast Transmitarrays" Nature communications 6, Oct. 2014, arXiv: 1410.8261v1 [physics.optics] (10 Pages Total).

Communication dated Dec. 14, 2017, issued by the European Patent Office in counterpart European Patent Application No. 13189763.9.

Nada A. O'Brien et al., "Miniature Near-Infrared (NIR) Spectrometer Engine For Handheld Applications", Published In SPIE Proceedings 8374: Next-Generation Spectroscopic Technologies V, Proc. of SPIE vol. 8374, pp. 837404-1-837404-8, doi: 10.1117/12.917983, (2012).

Shao-Wei Wang et al., "Concept of a high-resolution miniature spectrometer using an integrated filter array" Optics letters, vol. 32, No. 6, Mar. 2007, pp. 632-634.

Zhixuan Xia et al., "High resolution on-chip spectroscopy based on miniaturized microdonut resonators" Optics Express, vol. 19, No. 13, Jun. 2011, pp. 12356-12364.

https://en.wikipedia.org/wiki/Electromagnetic_metasurface, (2016).

Office Action dated Dec. 6, 2017 issued by the U.S. Patent and Trademark Office in U.S. Appl. No. 15/221,184.

Office Action dated Oct. 4, 2018 issued by the U.S. Patent and Trademark Office in U.S. Appl. No. 15/221,184.

Office Action dated Apr. 8, 2019 issued by the U.S. Patent and Trademark Office in U.S. Appl. No. 15/221,184.

Office Action dated Apr. 24, 2018 issued by the U.S. Patent and Trademark Office in U.S. Appl. No. 15/221,184.

Notice of Allowance dated Aug. 21, 2019 issued by the U.S. Patent and Trademark Office in U.S. Appl. No. 15/221,184.

Notice of Allowance dated Jul. 15, 2021 issued by the U.S. Patent and Trademark Office in U.S. Appl. No. 16/692,776.

\* cited by examiner

SPECTROMETER INCLUDING METASURFACE

CROSS-REFERENCE TO RELATED APPLICATIONS

This is a continuation of U.S. application Ser. No. 16/692,776 filed Nov. 22, 2019, which is a continuation of U.S. application Ser. No. 15/221,184 filed Jul. 27, 2016, which claims the benefit of U.S. Provisional Application No. 62/198,337, filed Jul. 29, 2015, in the U.S. Patent and Trademark office, and claims priority from Korean Patent Application No. 10-2016-0045802, filed Apr. 14, 2016, in the Korean Intellectual Property Office, the disclosures of which are incorporated by reference herein in their entireties.

STATEMENT REGARDING FEDERALLY SPONSORED RESEARCH

This invention was made with government support under Grant No. W911NF-14-1-0345 awarded by the ARO-US Army. The government has certain rights in the invention.

BACKGROUND

1. Field

Apparatuses consistent with exemplary embodiments relate to a spectrometer including a metasurface.

2. Description of the Related Art

Optical elements for changing transmittance, reflection, polarization, phase, intensity, and paths of incident light are used in various optical devices. The optical elements include a heavy lens, a mirror, etc., and, thus, it is difficult to miniaturize the optical devices including the optical elements. A spectrometer includes an optical element, and this may make the spectrometer big and heavy. Various research into miniaturizing a structure of the spectrometer and improving the performance of the spectrometer has been conducted.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments may provide a spectrometer including a metasurface.

According to an aspect of an exemplary embodiment, a spectrometer includes: a transparent substrate including a first surface and a second surface facing each other; a slit provided on the first surface and through which light to be examined is incident onto the transparent substrate; a spectrum optical system provided on the first surface or the second surface and including at least one metasurface including a plurality of nanostructures that are two-dimensionally arranged and a surrounding structure surrounding the plurality of nanostructures, wherein the at least one metasurface includes a focusing metasurface reflecting and focusing the light incident through the slit, at different angles based on respective wavelengths; and a sensor provided on the first surface or the second surface of the transparent substrate and receiving the light from the spectrum optical system.

The spectrometer may further include a block layer provided on the transparent substrate and blocking the light from being incident onto areas other than the slit.

The spectrum optical system may further include a collimating metasurface including a plurality of nanostructures that are two-dimensionally arranged to have a collimating function.

The collimating metasurface may be located on an optical path between the slit and the focusing metasurface.

The spectrum optical system may further include a grating metasurface including a plurality of nanostructures that are two-dimensionally arranged to have a chromatic dispersion function.

The grating metasurface may be located on an optical path between the collimating metasurface and the focusing metasurface.

The grating metasurface and the sensor may be provided on the first surface, and the collimating metasurface and the focusing metasurface may be provided on the second surface.

The grating metasurface, the collimating metasurface, the focusing metasurface, and the sensor may be two-dimensionally arranged, on a plan view seen from a direction perpendicular to the first surface.

The transparent substrate may include side surfaces connecting the first surface and the second surface, and on the plan view seen from the direction perpendicular to the first surface, the collimating metasurface and the grating metasurface may be arranged adjacent to one side surface of the side surfaces, and the focusing metasurface and the sensor may be arranged adjacent to the other side surface facing the surface.

In the at least one metasurface, a height of each of the plurality of nanostructures, or a longest diameter of a section of the plurality of nanostructures may be less than a wavelength of the light.

The spectrum optical system may include a grating metasurface, the grating metasurface may include a pattern including a plurality of nanostructures arranged apart from each other in a second direction, and the pattern may be cyclically repeated in a first direction that is perpendicular to the second direction.

The focusing metasurface may have one or more ring-shaped areas in which diameters of the plurality of nanostructures increase or decrease as the plurality of nanostructures distance from a point on the focusing metasurface.

The spectrum optical system may further include a split metasurface configured to split the light into first polarization light and second polarization light based on polarization and reflect the split first and second polarization lights based on wavelengths, and the sensor may include a first sensor configured to receive the split first polarization light and a second sensor configured to receive the split second polarization light.

The focusing metasurface may include a first focusing metasurface configured to focus the first polarization light to the first sensor and a second focusing metasurface configured to focus the second polarization light to the second sensor.

The split metasurface may include a pattern including a plurality of nanostructures arranged such that each diameter of elements thereof in a first direction increases and then decreases, and the pattern may be cyclically repeated in the first direction and a second direction that is perpendicular to the first direction.

When L is a total length of an optical path from the slit to the sensor and D is a thickness of the transparent substrate, L and D may satisfy the following inequality: L/D>3.

The surrounding structure may include at least one among silicon dioxide ($SiO_2$), glass, and a polymer.

The transparent substrate may include at least one among $SiO_2$, glass, and a polymer.

The plurality of nanostructures may include at least one among crystalline silicon (c-Si), amorphous silicon (a-Si), poly-silicon (p-Si), gallium phosphide (GaP), gallium arsenide (GaAs), silicon carbide (SiC), titanium dioxide ($TiO_2$), silicon nitride (SiN), and gallium nitride (GaN).

BRIEF DESCRIPTION OF THE DRAWINGS

The above and/or other aspects will become more apparent by describing certain exemplary embodiments with reference to the accompanying drawings, in which.

DETAILED DESCRIPTION

Figure 1:
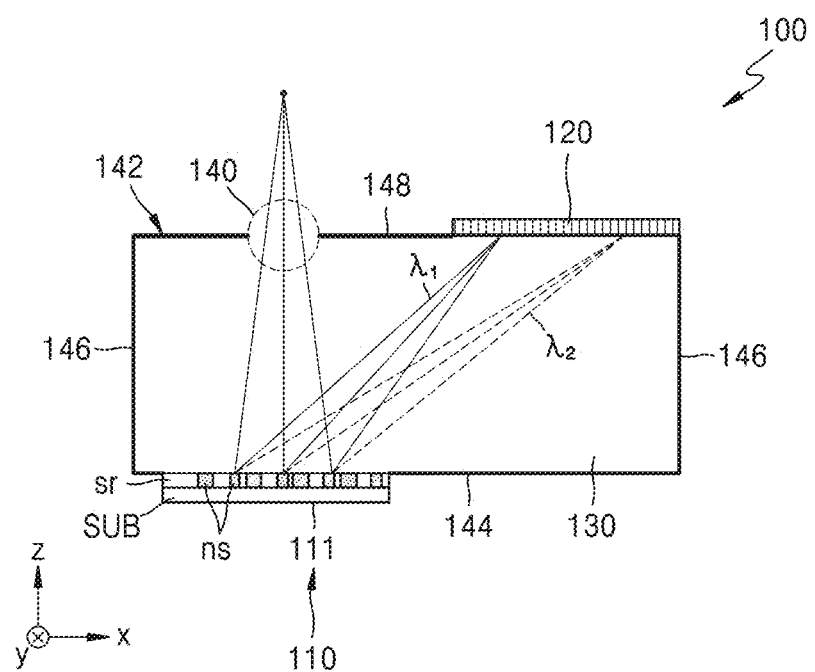
FIG. 1 is a schematic cross-sectional view of a spectrometer according to an exemplary embodiment.

Certain exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

FIG. 1 is a schematic cross-sectional view of a spectrometer 100 according to an exemplary embodiment.

Referring to FIG. 1, the spectrometer 100 according to the present exemplary embodiment may include a spectrum optical system 110 a metasurface, for example, a focusing metasurface 111, a sensor 120, a transparent substrate 130, and a slit 140.

The spectrometer 100 according to the present exemplary embodiment may replace the related art optical element having a relatively large size with the spectrum optical system 110 having a shape of a flat plate and including a metasurface. The related art optical element may include, for example, a collimator, a prism or grating pattern, a concave mirror, etc. The spectrum optical system 110 may be lighter and smaller than the related art optical element.

The transparent substrate 130 may include a material that is transparent with respect to incident light and has a low refractive index. For example, the incident light may be light, such as visible rays, infrared rays, and ultraviolet rays, and the transparent substrate 130 may have transparency with respect to the light. The transparency may denote hardly any or almost no optical loss when light proceeds onto the transparent substrate 130. For example, the transparent substrate 130 may include a glass-based material, or a polymer. The polymer may include PMMA, PDMS, SU8, or the like. The transparent substrate 130 including the polymer may be flexible.

The transparent substrate 130 may have a shape of a flat plate. The flat plate may include a first surface 142 and a second surface 144 facing the first surface 142, wherein the first surface 142 and the second surface 144 have a relatively greater width than each of side surfaces 146 connecting the first surface and the second surface. The flat plate may include a plate having a curved shape, in addition to the plate having the flat shape.

Referring to FIG. 1, the spectrum optical system 110 may include at least one metasurface, for example, a focusing metasurface 111, including a plurality of nanostructures ns that are two-dimensionally arranged and a surrounding structure sr surrounding the plurality of nanostructures. The nanostructures ns may have various arrangements in the metasurface. According to the various arrangements of the nanostructures ns, the metasurface may function as various optical elements. For example, the spectrum optical system 110 may include the metasurface functioning as a collimator, a grating element, a focusing mirror, etc.

The nanostructures ns may have a higher refractive index than the surrounding structure sr. The nanostructures ns may have a higher refractive index than the transparent substrate 130. The nanostructures ns and the surrounding structure sr may be provided on a substrate SUB, and the nanostructures ns may have a greater refractive index than the substrate SUB. Each metasurface may have a shape in which the nanostructures ns and the surrounding structure sr are arranged on the substrate SUB. However, the substrate SUB may be removed after a metasurface is formed. Referring to FIG. 1, it is illustrated that the metasurface includes the substrate SUB. However, an exemplary embodiment is not limited thereto.

The nanostructures ns may function like a resonator due to a high-contrast refractivity difference with respect to the surrounding structure sr. For example, each of the nanostructures ns may temporarily capture incident light. As the refractivity difference between the nanostructures ns and the surrounding structure sr increases, the nanostructures ns may capture a greater amount of light in each of the nanostructures ns for a longer time. A wavelength range of the light captured by the nanostructures ns is called a resonant wavelength range, and each of nanostructures ns may have a different resonant wavelength range. For example, the resonant wavelength range may be different for each of the nanostructures ns, based on a shape, a size, and a refractive index of the nanostructure ns. Hereinafter, a central wavelength of the resonant wavelength range will be referred to as a resonant wavelength.

The nanostructures ns may emit the captured light. Here, the light emitted from the nanostructures ns may have different phases according to shapes of the nanostructures ns.

The light of the nanostructures ns may satisfy a sub-wavelength scattering or a sub-wavelength grating condition. For example, the nanostructures ns may have a dimension element which is shorter than the resonant wavelength. The dimension element may denote a length element of a three-dimensional (3D) shape of the nanostructure, such as a height, a diameter, etc., of the nanostructure ns. For example, light of an area of infrared rays or visible rays has a wavelength of hundreds of nm, and thus, the dimension element of the nanostructure ns for transmitting and receiving visible rays may be equal to or less than hundreds of nm. Thus, a greatest length of the dimension elements of the plurality of nanostructures ns may be less than a wavelength of incident light.

Light that is incident onto and emitted from an arrangement of nanostructures ns that satisfies the sub-wavelength scattering condition may have optical characteristics that vary according to a shape or a volume of the nanostructures ns, and the arrangement of the nanostructures ns. For example, the light emitted from the nanostructures ns may have optical characteristics that vary, such as a wavelength, polarization, and an emission (or reflection) angle, etc.

The nanostructures ns may include a material having a higher refractive index than a material of the surrounding structure sr. For example, the nanostructures ns may include at least one among c-Si, a-Si, p-Si, e.g., poly silicon, GaP, GaAs, SiC, $TiO_2$, SiN, and GaN. Alternatively, the nanostructures ns may include a metal. The nanostructures ns including a metal may cause a surface plasmon effect with respect to the surrounding structure sr.

The surrounding structure sr and the transparent substrate 130 may include a material having a lower refractive index than the material of the nanostructures ns. For example, the nanostructures ns may have a 1.5 times greater refractive index than the surrounding structure sr and the transparent substrate 130. The surrounding structure sr may include a material which is transparent with respect to incident light. For example, the surrounding structure sr may include the same material as the transparent substrate 130. For example, the surrounding structure sr may include a glass material, $SiO_2$, or a polymer. The polymer may include PMMA, PDMS, SU8, or the like.

The surrounding structure sr does not need to be formed as an additional component, and may be a portion of the transparent substrate 130 on which the plurality of nanostructures ns are arranged.

For example, the integrated spectrum optical system 110 may be formed on the transparent substrate 130 as follows. First, a material of the nanostructures ns may be deposited or spread on the transparent substrate 130. Second, the material of the nanostructures ns may be shaped, by using a semiconductor process, as a specific pattern on a portion of the transparent substrate 130, on which the spectrum optical system 110 is to be formed. Third, a material that is the same as the material of the transparent substrate 130 may be deposited or spread on the deposited or spread material of the nanostructures ns to form the surrounding structure sr surrounding the nanostructures ns. The described operations for forming the spectrum optical system 110 are only an example, and an exemplary embodiment is not limited thereto.

The metasurface may have functions of various optical elements according to arrangements of nanostructures ns. The spectrometer 100 according to the present exemplary embodiment may include the spectrum optical system 110, which replaces optical elements of the spectrometer of the related art, with, for example, the focusing metasurface 111, a collimating metasurface 212 of FIG. 4, a grating metasurface 213 of FIG. 4, etc.

The focusing metasurface 111 may function as a focusing mirror. The focusing metasurface 111 may focus light incident onto the slit 140 to different locations based on wavelengths, and may make the focused light be incident onto the sensor 120 so that the light becomes spectral. This aspect will be described in detail with reference to FIGS. 2 and 3.

The sensor 120 may receive the light for each wavelength. The sensor 120 may include a sensor for receiving light. The sensor 120 may include a pixel sensor, such as a charge coupled device (CCD), a complementary metal-oxide semiconductor (CMOS), or an InGaAs sensor, which may receive the light one-dimensionally or two-dimensionally.

The slit 140 may adjust an amount of and an incident angle of light that is incident onto the transparent substrate 130. For example, the slit 140 may be an opening of a certain size, which is not blocked by a block layer 148. For example, the slit 140 may include a convex lens that may focus the incident light. The convex lens may include a transmittance-type metasurface lens including nanostructures ns and a surrounding structure sr. For example, a diameter of the slit 140 may be changed to adjust an influx amount of light.

The spectrometer 100 may further include the block layer 148 to block external light. The block layer 148 may be disposed on the transparent substrate 130 and may absorb light so that the light is not transmitted inside the transparent substrate 130 through the areas other than the slit 140. The block layer 148 may include a material reflecting or absorbing light, such as ultraviolet rays, visible rays, and infrared rays. For example, the block layer 148 may include a metal material to reflect external light. For example, the block layer 148 may include a light absorption material, such as carbon black, to absorb light. The block layer 148 may block an influx of external light except the light incident onto the slit 140, thereby improving the spectrum efficiency of the spectrometer 100. The block layer 148 may be provided to surround the transparent substrate 130 except the slit 140. For example, the block layer 148 may be formed by coating an external surface of the transparent substrate 130 with the metal material. That is, the block layer 148 may be formed by using a material for blocking external light from being transmitted to the spectrometer 100, and is not limited to specific structures or materials.

The spectrometer 100 according to the present exemplary embodiment includes only the focusing metasurface 111 in the spectrum optical system 110, and thus, the spectrometer 100 may have a simple structure and a relatively smaller size.

Figure 2:
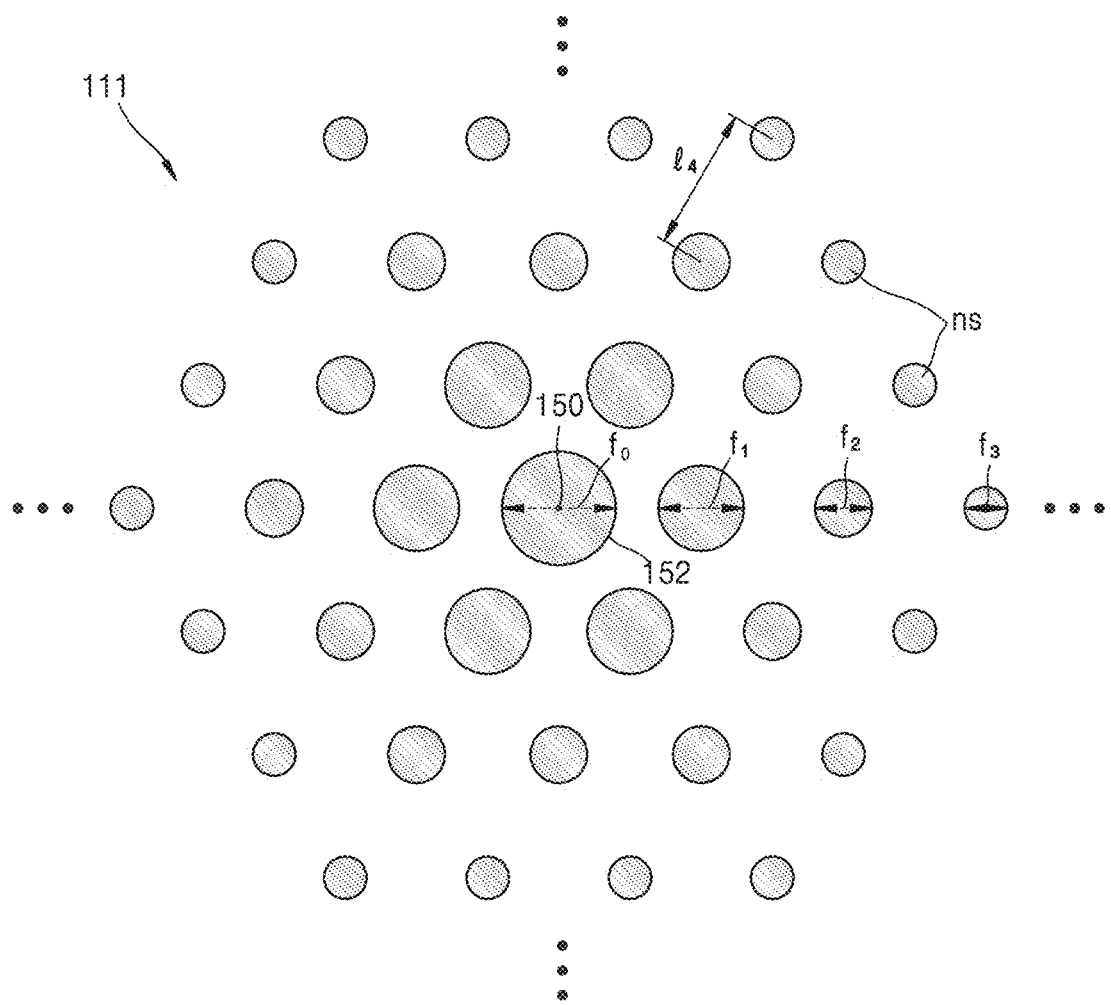
FIG. 2 is a view of a focusing metasurface according to an exemplary embodiment.
Figure 3:
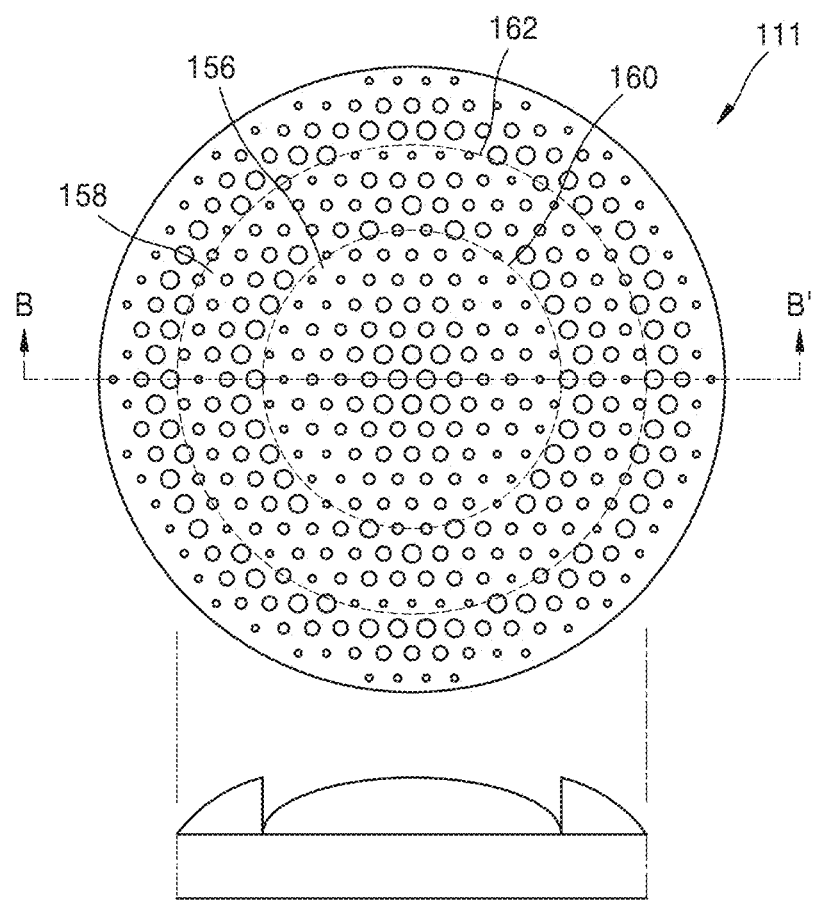
FIG. 3 is a view of a focusing metasurface according to an exemplary embodiment.

FIGS. 2 and 3 are views of the focusing metasurface 111 according to an exemplary embodiment.

Referring to FIG. 2, the focusing metasurface 111 may include an arrangement of the plurality of nanostructures ns functioning as the focusing mirror. The plurality of nanostructures ns may be arranged such that diameters or dimensions of the cross-sections thereof gradually decrease or increase, as the distance of the plurality of nanostructures ns from a point, e.g., a point 150, on the focusing metasurface 111 increase. For example, the plurality of nanostructures ns may be arranged such that a distance 14 from a center of one nanostructure to a center of another nanostructure is constant, and such that duty ratios of the nanostructures ns decrease as the distance of the nanostructures ns from a point of the focusing metasurface 111 increase. When a diameter of a nanostructure 152, which is the closest to a point 150, is $f_0$, and diameters of nanostructures ns, which are disposed apart from each other and from the nanostructure 152, are respectively $f_1$, $f_2$, and $f_3$, a relationship of $f_0 > f_1 > f_2 > f_3$ is achieved. A group of nanostructures ns that satisfies the relationship of $f_0 > f_1 > f_2 > f_3$ may be referred to as a ring-shaped area, and the focusing metasurface 111 may include at least one ring-shaped area.

Referring to FIG. 3, the focusing metasurface 111 may include a plurality of ring-shaped areas in which diameters of cross-sections of nanostructures ns gradually decrease, as the distance of the nanostructures ns from a certain point on the focusing metasurface 111 increase. For example, the focusing metasurface 111 may include a first ring-shaped area 156 and a second ring-shaped area 158 arranged such that the nanostructures ns in each of the first ring-shaped area 156 and the second ring-shaped area 158 have gradually decreasing diameters as the nanostructures ns are located further away from a center point, e.g., a point 150 of FIG. 2, toward the outside (reference numerals 160 and 162) of each of the first ring-shaped area 156 and the second ring-shaped area 158.

In the cross-sectional view B-B' of the focusing metasurface 111, a phase of light emitted from the focusing metasurface 111 may have a phase change of 2pi, between the first ring-shaped area and the second ring-shaped area.

The focusing metasurface 111 may have adjustable diameters of the nanostructures, distances between the nanostructures ns, shapes of sections, materials, duty ratios, and shapes of ring-shaped areas to control various characteristics of light, such as a shape, an angle, chromatic dispersion, etc., of light that is focused.

Figure 4:
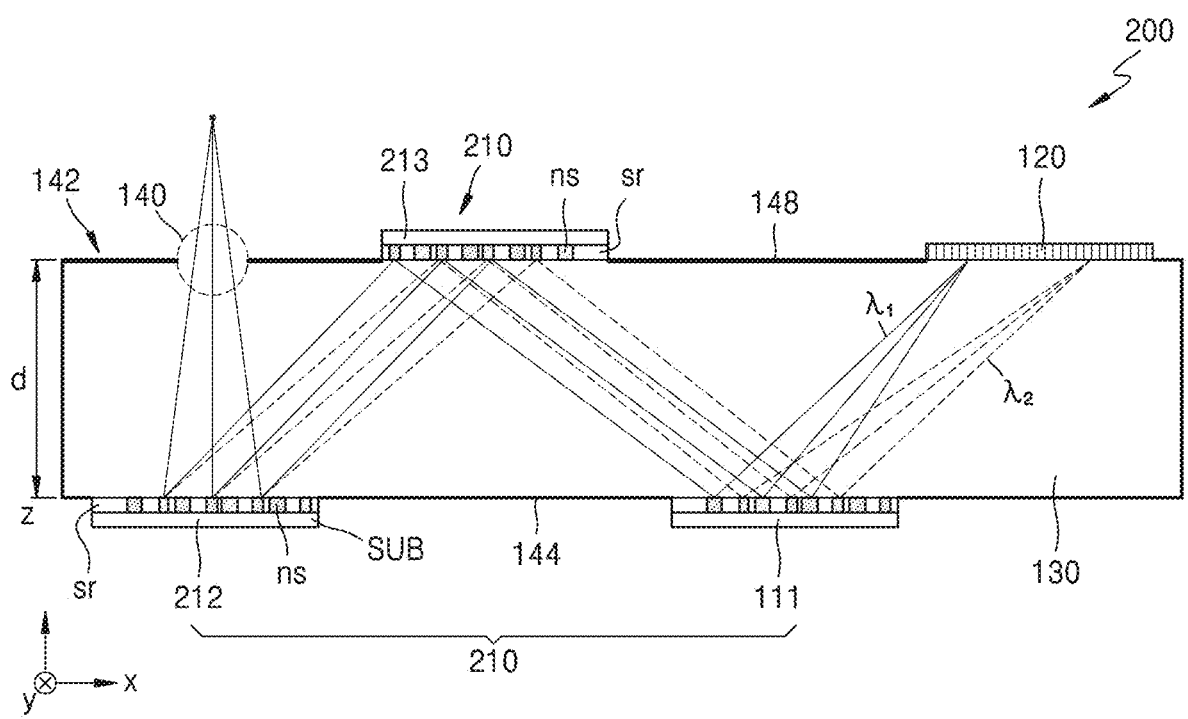
FIG. 4 is a schematic cross-sectional view of a spectrometer according to an exemplary embodiment.

FIG. 4 is a schematic cross-sectional view of a spectrometer 200 according to an exemplary embodiment.

Referring to FIG. 4, the spectrometer 200 according to the present exemplary embodiment may include a spectrum optical system 210 further including the collimating metasurface 212 disposed on the second surface 144 to receive the light from the slit 140, and the grating metasurface 213 disposed on the first surface 120 to receive light focused by the focusing metasurface 111. The structure of the collimating metasurface 212 and the grating metasurface 213 may be substantially similar to that of the focusing metasurface 111 and repeated descriptions will be omitted. Components of the spectrometer 200, which are the same as the components of the spectrometer 100, will not be repeatedly described.

The collimating metasurface 212 may function as a light deflector and/or a collimator. The collimating metasurface 212 may make a wavefront of light incident through the slit 140 into a plane wave and collimate, reflect, and/or diffract the plane wave to prevent diffusion of the light, and may polarize the collimated, reflected and diffracted plane wave by a certain angle toward the grating metasurface 213.

The collimating metasurface 212 may be formed by properly mixing characteristics of the grating metasurface 213 and the focusing metasurface 111. For example, when a shape (a shape of a wavefront and an intensity distribution) of the light incident through the slit 140, and a shape of the plane wave reflected from the collimating metasurface 212 are predetermined, the collimating metasurface 212 of a desired shape may be formed. In detail, based on the shape of the incident light and the shape of the plane wave, a reflection phase distribution that the collimating metasurface 212 may be determined based on a location of the collimating metasurface 212. The reflection phase distribution may correspond to a section of a hologram. For example, when the wavefront of the incident light is similar to a diverging square wave, the collimating metasurface 212 may have the reflection phase distribution in which a phase distribution of a metasurface functioning as a concave mirror and a phase distribution of the grating metasurface 213 diffracting a plane wave incident beam in a certain direction are added.

The grating metasurface 213 may function as a grating element. The grating metasurface 213 may reflect and/or diffract light at different angles according to wavelengths. An arrangement of nanostructures of the grating metasurface 213 will be described in detail with reference to FIGS. 6 through 8.

When an average length of an optical path from the slit 140 to the sensor 120 for receiving light is L, the spectrum performance of the spectrometer 200 may be improved, as L increases.

The principle, based on which the spectrum efficiency of the spectrometer 200 is improved as L increases, will be described. The metasurface having the arrangement of nanostructures may have a chromatic dispersion characteristic reflecting and diffracting light of different wavelengths by different angles. The chromatic dispersion characteristic of metasurface elements having different diffraction angles for each wavelength makes a greater difference of a location of a focal point of light for each wavelength in the sensor 120, as the total optical length increases. Thus, when light of each wavelength transmitted through the metasurface is incident in sufficiently different locations (pixels) of the sensor 120, spectrum resolution (an incident wavelength distance/pixel size) may increase.

The spectrometer 200 according to the present exemplary embodiment may obtain a sufficient spectrum efficiency, by making the average length L of the optical path sufficiently great, compared to a thickness d of the transparent substrate 130, by replacing the related art optical element with the thin flat-shaped metasurface. For example, the spectrometer 200 may satisfy the following inequality.

$$L/d > 3 \qquad \text{[Inequality 1]}$$

The spectrometer 200 according to the present exemplary embodiment may have the arrangement and dimension elements of the spectrum optical system 210 to satisfy Inequality 1. The spectrometer 200 satisfying Inequality 1 may have a high spectrum efficiency. The grating metasurface 213 may increase the length L of the optical path of the light incident onto the spectrometer 200.

Figure 5:
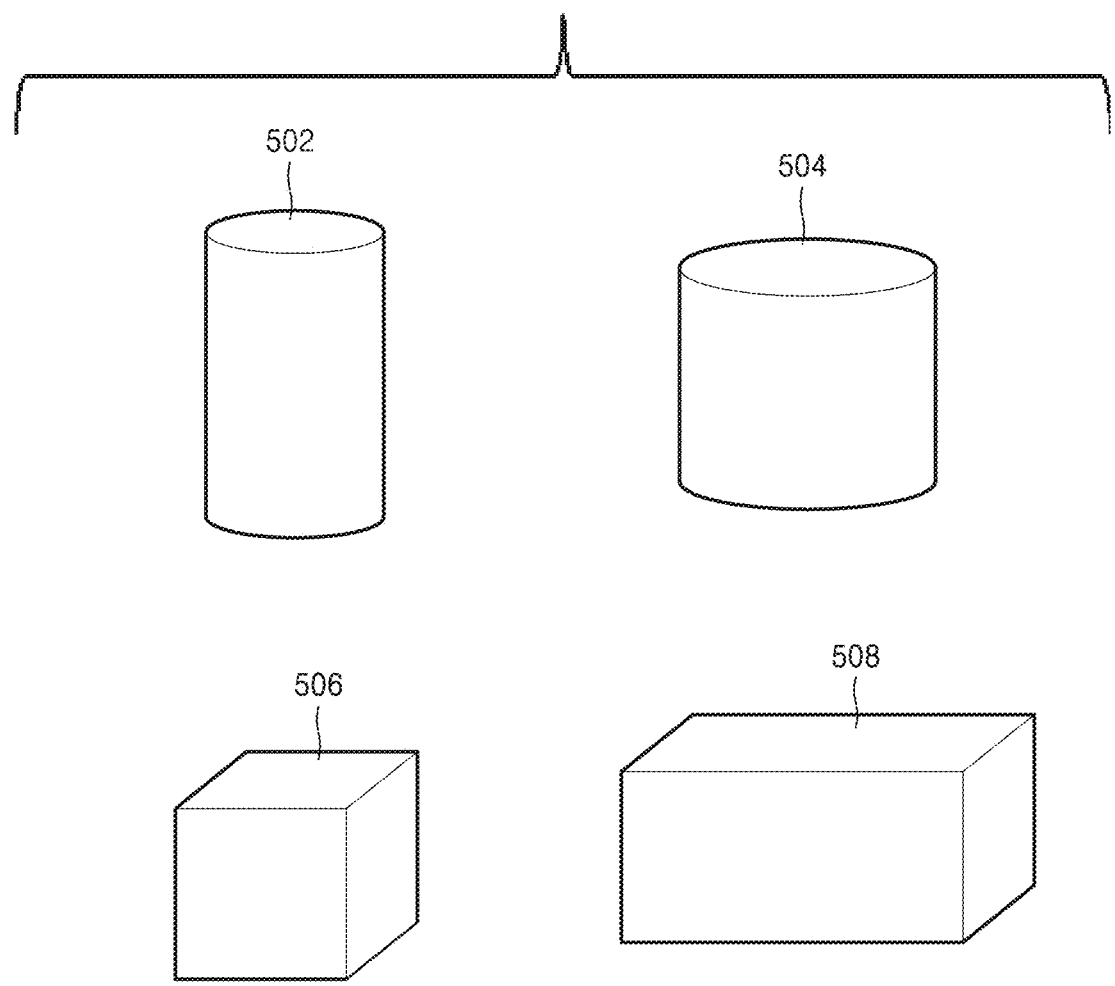
FIG. 5 shows schematic perspective views of shapes of a nanostructure.

FIG. 5 is a perspective view of a schematic shape of a plurality of nanostructures ns.

Referring to reference numerals 502, 504, 506, and 508 of FIG. 5, the plurality of nanostructures ns may have various shapes. The plurality of nanostructures ns may have a pillar structure. For example, the nanostructures ns may have a cross-section of a shape of any one of a circle, an oval, a rectangle, and a square. The nanostructures ns included in a metasurface may have various heights and shapes of cross-sections on a two-dimensional surface.

Figure 6:
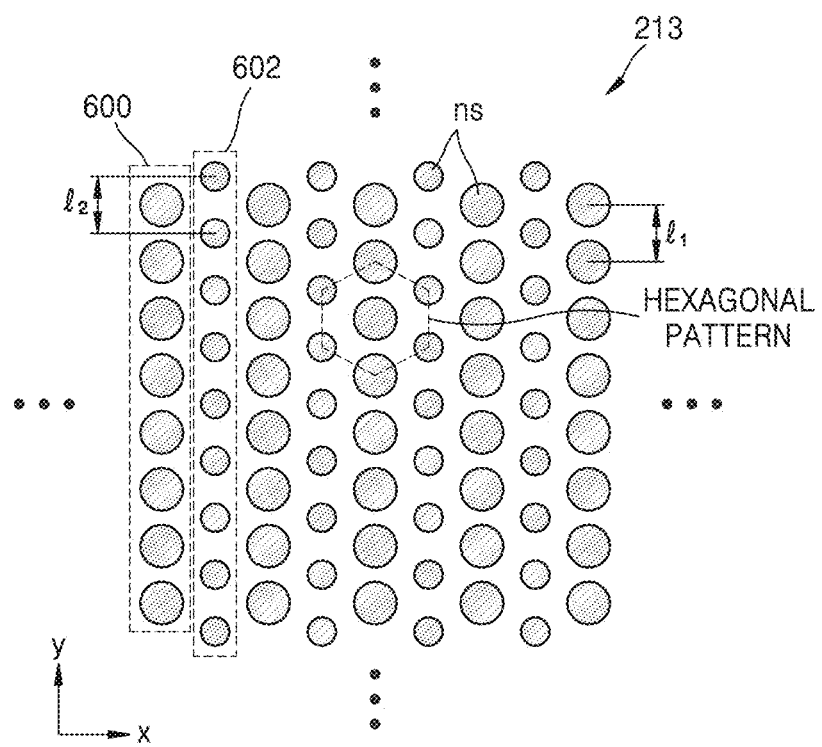
FIG. 6 is a view of a grating metasurface according to an exemplary embodiment.
Figure 7:
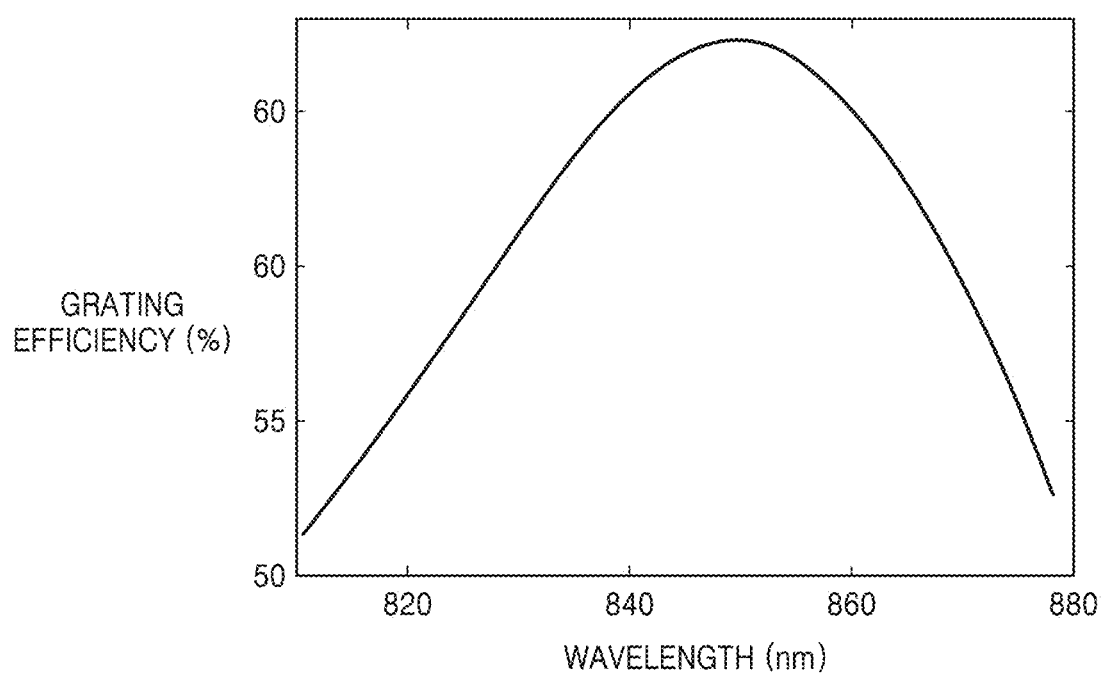
FIG. 7 is a graph of a grating efficiency of the grating metasurface according to an exemplary embodiment.

FIG. 6 is a view of the grating metasurface 213 according to an exemplary embodiment. FIG. 7 is a graph showing a grating efficiency of the grating metasurface 213 of FIG. 6.

Referring to FIG. 6, the arrangement of nanostructures ns may correspond to an arrangement of nanostructures ns of the grating metasurface 213.

When a length of a dimension element of the nanostructures ns is less than a resonant wavelength of each nanostructure ns, light incident onto the nanostructure ns may be sub-wavelength grated, as described above. Thus, the arrangement of nanostructures ns of the grating metasurface 213 may be such that the nanostructures ns having the same sectional shapes and sectional areas are repeatedly arranged in a constant cycle. The cycle denotes a distance from a center of a nanostructure ns to a center of another nanostructure adjacent to the nanostructure. The cycle is less than the resonant wavelength. A wavelength resolution effect of the grating metasurface 213 is not all the same for light of every wavelength range, and may be different for light of each wavelength based on a shape or an area of a crosssection of each nanostructure ns, and a distance between the nanostructures ns.

Referring to FIG. 6, the arrangement of nanostructures ns according to the present exemplary embodiment may include a first-first pattern 600 and a first-second pattern 602 cyclically repeated in an x axis direction. The first-first pattern 600 and the first-second pattern 602 are only an example, and other patterns may further be included in the arrangement of nanostructures ns. For convenience of explanation, an exemplary embodiment including the first-first pattern 600 and the first-second pattern 602 will be described.

The first-first pattern 600 may include the plurality of nanostructures ns cyclically repeated in the y axis direction. Sectional areas and shapes of the plurality of nanostructures ns included in the first-first pattern 600 may be the same. A duty ratio of the first-first pattern 600 may be constant. For example, the plurality of nanostructures ns may be cyclically repeated in the y axis direction, while disposed apart by a distance $l_1$.

The first-second pattern 602 may include the plurality of nanostructures ns cyclically repeated in the y axis direction. Sectional areas and shapes of the plurality of nanostructures ns included in the first-second pattern 602 may be the same. A duty ratio of the first-second pattern 602 may be constant. For example, the plurality of nanostructures ns may be cyclically repeated in the y axis direction, while disposed apart by a distance $l_2$. The cross-section of the plurality of nanostructures ns included in the first-first pattern 600 and the cross-section of the plurality of nanostructures ns included in the first-second pattern 602 may have the same size or different sizes.

The distances $l_1$ and $l_2$ may be the same. The duty ratios of the first-first pattern 600 and the first-second pattern 602 may be the same or different. The duty ratios and heights of the nanostructures ns of the first-first pattern 600 and the first-second pattern 602 may be adjusted to adjust a corresponding wavelength range of a grating pattern.

The first-first pattern 600 and the first-second pattern 602 may be arranged to be alternately repeated in the x axis direction. The nanostructures ns of the first-first pattern 600 and the first-second pattern 602 may be aligned or shifted with respect to each other in the x axis direction. For example, some of the nanostructures ns of the first-first pattern 600 and the first-second pattern 602 may be shifted to have a hexagonal pattern. For example, the plurality of nanostructures ns forming the hexagonal pattern may be arranged such that centers of the nanostructures ns forming the hexagonal pattern may be connected to form a regular hexagon.

The arrangement of nanostructures ns having repeated hexagonal patterns in the x axis direction and the y axis direction may have a greater grating efficiency than the arrangement of nanostructures ns having aligned patterns.

Referring to FIG. 7, the x axis of the graph may indicate a wavelength of light, and the y axis of the graph may indicate a grating efficiency (%). For example, the arrangement of nanostructures ns of FIG. 4 may have a grating efficiency that is equal to or higher than 55%, with respect to light of wavelength ranges between 820 nm and 870 nm.

Figure 8:
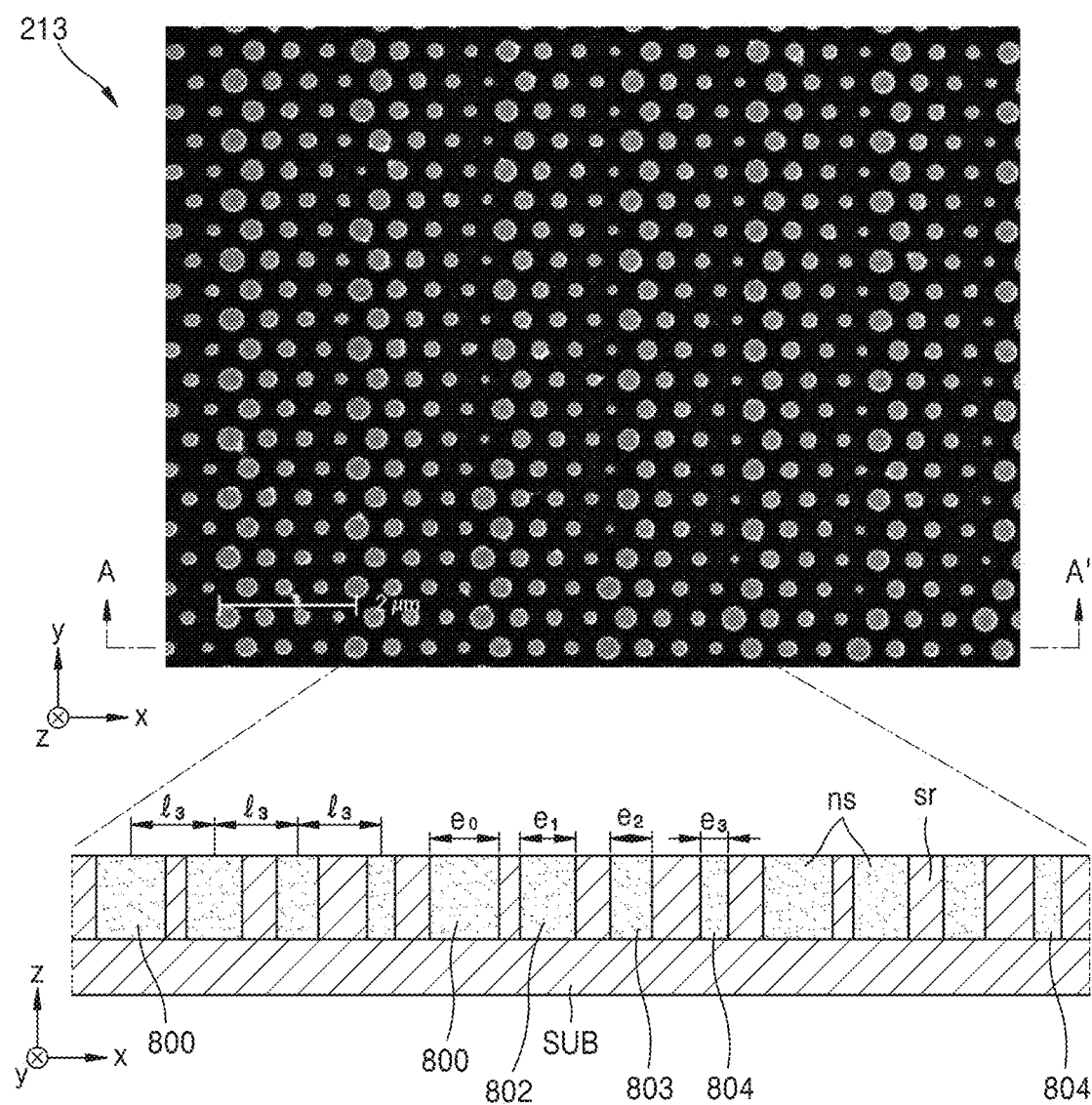
FIG. 8 is a view of a grating metasurface according to an exemplary embodiment.

FIG. 8 is a view of a grating metasurface 213 according to an exemplary embodiment. Referring to FIG. 8, a plan view of the grating metasurface 213 and a cross-sectional view A-A' of the grating metasurface 213 of the plan view are illustrated. The grating metasurface 213 may include a pattern including a plurality of nanostructures ns arranged such that sectional areas of the nanostructures ns gradually increase or decrease in the x axis direction.

The pattern may be cyclically repeated in the x axis direction and a distance between centers of each two nanostructures is a constant distance 13. For example, the pattern may be a pattern having sectional areas gradually decreasing from a left side to a right side, in a +x axis direction. For example, the pattern may include nanostructures 800, 802, 803, and 804 having diameters $e_0$, $e_1$, $e_2$, and $e_3$, respectively decreasing in the +x axis direction, so that the diameters $e_0$, $e_1$, $e_2$, and $e_3$ may satisfy the relationship of $e_0 > e_1 > e_2 > e_3$. For example, the diameters $e_0$, $e_1$, $e_2$, and $e_3$ may be designed to sample a phase of light reflected from each nanostructure ns within the distance $l_3$, by the same distance between 0 and 2pi (for example, 0, pi/2, pi, and 3pi/2). The grating metasurface 213 having this structure may give a momentum of $2pi/l_3$ in the +x direction. Incident light may be reflected and diffracted by being polarized to the right side, in correspondence to a momentum that is given when the light is incident, to which the above-described momentum is added.

The pattern may be cyclically repeated in the x axis direction. The pattern may be aligned or misaligned in the y axis direction and/or in the x axis direction. For example, the pattern may be arranged such that nanostructures ns having the same sectional areas in the y axis direction are cyclically repeated in an aligned fashion. For example, the pattern may be arranged such that nanostructures ns having different sectional areas in the y axis direction are cyclically repeated in a shifted fashion to form a hexagonal pattern.

Figure 9:
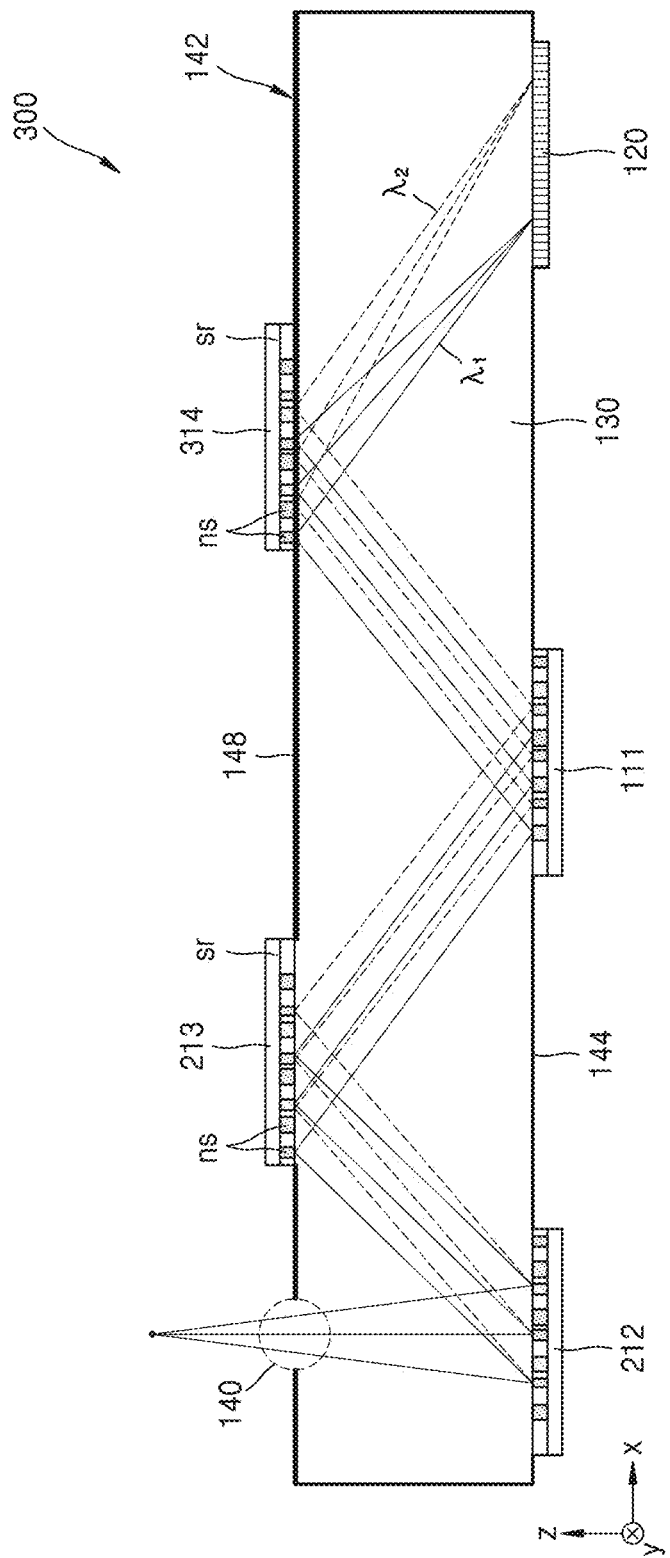
FIG. 9 is a schematic cross-sectional view of a spectrometer according to an exemplary embodiment.

FIG. 9 is a schematic cross-sectional view of a spectrometer 300 according to an exemplary embodiment. The spectrometer 300 according to the present exemplary embodiment has substantially the same components as the spectrometer 200 of FIG. 4, except that the spectrometer 300 includes an aberration control metasurface 314 disposed on the first surface 142, and thus, repeated descriptions will be omitted.

Referring to FIG. 9, light may be incident onto the transparent substrate 130 by passing through the slit 140, and may sequentially pass through the collimating metasurface 212, the grating metasurface 213, the focusing metasurface 111, and the aberration control metasurface 314, and be received by the sensor 120. Due to the aberration control metasurface 314, a length L of an optical path of the spectrometer 300 may be increased. The aberration control metasurface 314 may have a function of correcting aberration so that light of various wavelengths focused by the focusing metasurface 111 is incident onto each pixel location of the sensor 120, which corresponds to each wavelength.

For example, the focusing metasurface 111 may also have a characteristic of a lens since light is incident to nanostructures ns and refracted. For example, light having passed through the focusing metasurface 111 may form an image in the sensor 120 in a shifted position due to chromatic aberration, spherical aberration, and astigmatic aberration. The aberrations may decrease a spectrum efficiency of the sensor 120. The aberration control metasurface 314 may have an arrangement of nanostructures ns to have an aberration control function. For example, the aberration control metasurface 214 may have the arrangement of nanostructures of the focusing metasurface 111 described above, or an arrangement of nanostructures having a function of a slight convex or concave lens.

Figure 10:
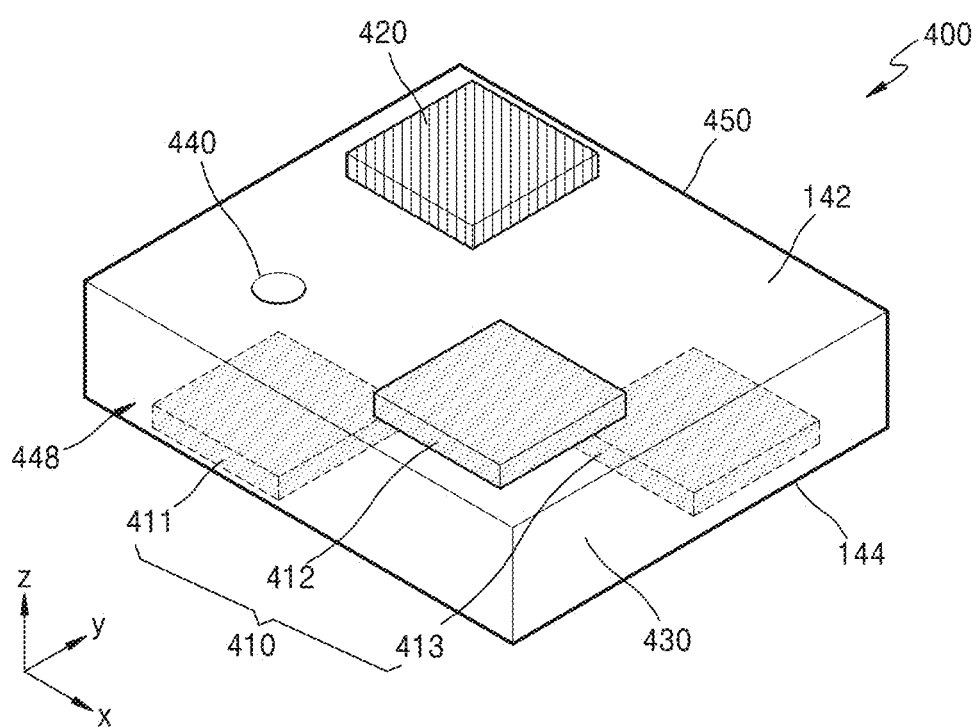
FIG. 10 is a schematic cross-sectional view of a spectrometer according to an exemplary embodiment.
Figure 11:
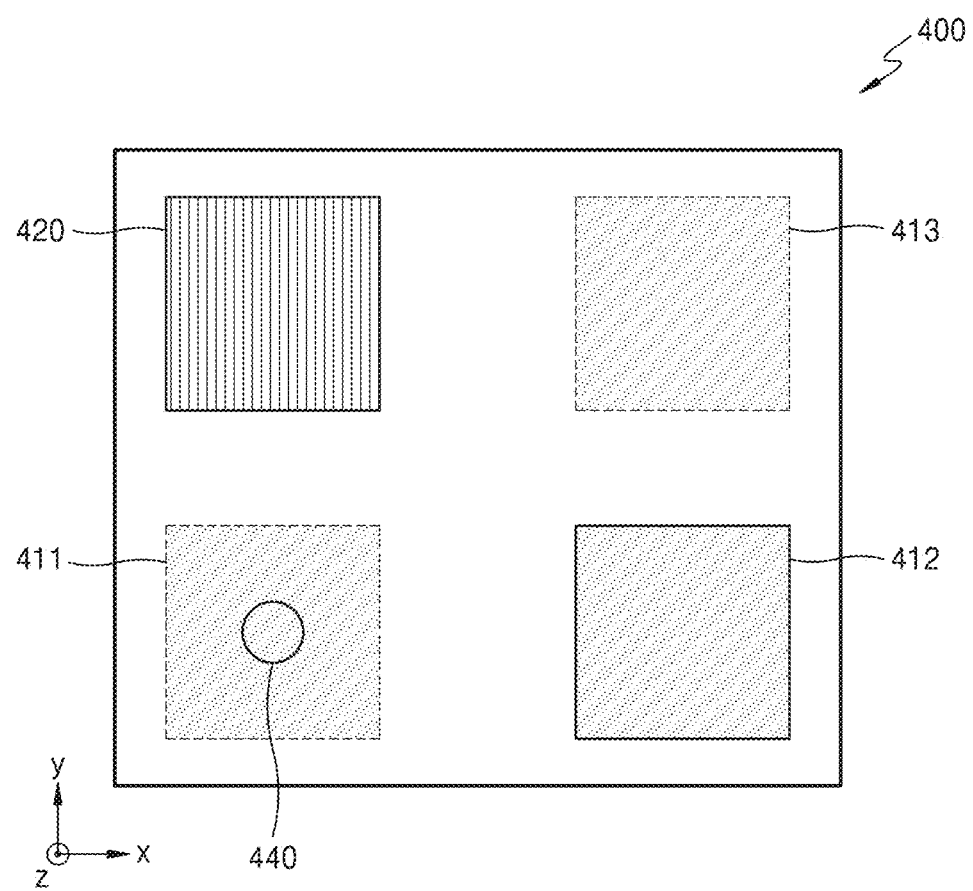
FIG. 11 is a schematic plan view of the spectrometer of FIG. 10.

FIG. 10 is a schematic cross-sectional view of a spectrometer 400 according to an exemplary embodiment. FIG. 11 is a schematic plan view of the spectrometer 400 of FIG. 10, seen from a direction.

Referring to FIG. 10, the spectrometer 400 according to the present exemplary embodiment may include a collimating metasurface 411, a grating metasurface 412, a focusing metasurface 413, and a sensor 420.

The collimating metasurface 411 may be provided below a slit 440 in a z axis direction. The grating metasurface 412 may be provided at a certain distance from the collimating metasurface 411 in an x axis direction and the z axis direction. The focusing metasurface 413 may be provided at a certain distance from the grating metasurface 412 in a y axis direction and the z axis direction. The sensor 420 may be provided at a certain distance from the focusing metasurface 413 in the x axis direction and the z axis direction. Light may be incident onto a transparent substrate 430 through the slit 440, and may pass through the collimating metasurface 411, the grating metasurface 412, and the focusing metasurface 413 and be received by the sensor 420.

The focusing metasurface 413 may have substantially the same focusing function as the focusing metasurface 111 of FIG. 1, and may have a function of adding an optical momentum to light in a certain direction. For example, the focusing metasurface 413 may include a pattern in which nanostructures are arranged on an x-y plane in a diagonal shape. For example, the grating metasurface 412 may be arranged such that the nanostructures are cyclically arranged on a line satisfying a function of $y=a_1*(-x)+a_2$. Here, $a_1$ and $a_2$ may be rational numbers.

The collimating metasurface 411, the grating metasurface 412, the focusing metasurface 413, and the sensor 420 may be three-dimensionally arranged. The 3D arrangement of the metasurfaces may denote that a line connecting centers of the metasurfaces provided in the spectrometer 400 has a 3D shape. The spectrometer 400 including the three-dimensionally arranged metasurfaces may have a length of an optical path that is sufficiently great, with respect to a volume of the spectrometer 400, and thus, spectrum efficiency is improved. For example, when the collimating metasurface 411 and the grating metasurface 412 are located adjacent to a first side surface 448 of the transparent substrate 430, the focusing metasurface 413 and the sensor 414 may be arranged adjacent to a second side surface 450 facing the first side surface 448.

The grating metasurface 412 may have substantially the same grating function as the grating metasurface 213 described above. However, in correspondence to the metasurfaces that are three-dimensionally arranged, the optical path also has to be three-dimensionally formed.

The grating metasurface 412 and the focusing metasurface 413 may have a function of adding an optical momentum for shifting reflected incident light, for example, by 90° in a horizontal direction. The optical momentum is a term describing straightness of light from a perspective of inertia. For example, the grating metasurface 412 may include a pattern in which nanostructures are cyclically arranged on an x-y plane in a diagonal shape. For example, the grating metasurface 412 may be arranged such that the nanostructures are cyclically arranged on a line satisfying a function of $y=b_1*x+b_2$. Here, $b_1$ and $b_2$ may be real numbers.

Referring to FIG. 11, in the spectrometer 400, seen from the z axis direction, the collimating metasurface 411, the grating metasurface 412, the focusing metasurface 413, and the sensor 420 may be two-dimensionally arranged. For example, the collimating metasurface 411, the grating metasurface 412, the focusing metasurface 413, and the sensor 420 may be arranged in a quadrangular shape, when seen from the z axis direction. However, it is only an exemplary embodiment, and the collimating metasurface 411, the grating metasurface 412, the focusing metasurface 413, and the sensor 420 may have arrangements of various shapes, such as a circle, an oval, etc. based on a plane seen from the z axis direction.

Figure 12:
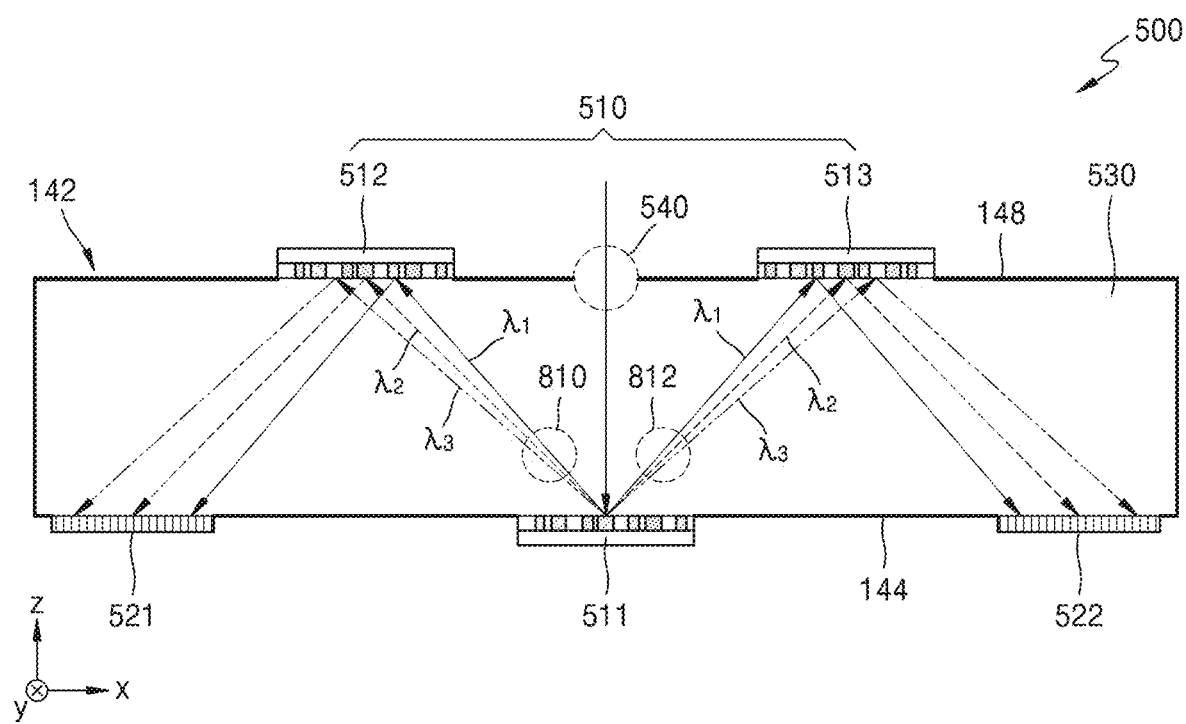
FIG. 12 is a schematic perspective view of a spectrometer according to an exemplary embodiment.

FIG. 12 is a schematic cross-sectional view of a spectrometer 500 according to an exemplary embodiment.

Referring to FIG. 12, the spectrometer 500 according to the present exemplary embodiment may include a split metasurface 511, a first focusing metasurface 512, a second focusing metasurface 513, a first sensor 521, and a second sensor 522. For example, the split metasurface 511 may be disposed on the second surface 144 and the first focusing metasurface 512 and the second focusing metasurface 513 may be disposed on the first surface 142.

The split metasurface 511 may function as a polarization beam splitter while having a grating function. The split metasurface 511 may reflect light by splitting the light into two opposite directions, as first polarization light 810 and second polarization light 812, based on polarization. Also, the split metasurface 511 may split the light such that the light proceeds in slightly different directions based on wavelengths, for example, illustrated as rays λ1, λ2, and λ3. Detailed structures of the split metasurface 511 will be described later with reference to FIGS. 13 and 14. After the split metasurface 511 splits the light into the first polarization light 810 and the second polarization light 812, the split metasurface 511 may resolve the first polarization light 810 based on each wavelength to transmit the resolved first polarization light 810 to the first focusing metasurface 512, and may resolve the second polarization light 812 based on each wavelength to transmit the resolved second polarization light 812 to the second focusing metasurface 513. For example, the first polarization light 810 may be TE mode light, and the second polarization light 812 may be TM mode light, or vice versa.

The first focusing metasurface 512 and the second focusing metasurface 513 have substantially the same functionality as the focusing metasurface 111 of FIG. 1, and thus, detailed descriptions of the first focusing metasurface 512 and the second focusing metasurface 513 will be omitted. The first focusing metasurface 512 may focus the first polarization light 810 and transmit the focused first polarization light 810 to the first sensor 521. The second focusing metasurface 513 may focus the second polarization light 812 and transmit the focused second polarization light 812 to the second sensor 522.

The first sensor 521 and the second sensor 522 are substantially the same as the sensor 120 of FIG. 1, and thus, detailed descriptions of the first sensor 521 and the second sensor 522 will be omitted.

The spectrometer 500 may additionally resolve light elements based on polarization, and may have a sufficiently long optical path, with respect to a volume of the spectrometer 500, to thereby increase spectrum efficiency.

Figure 13:
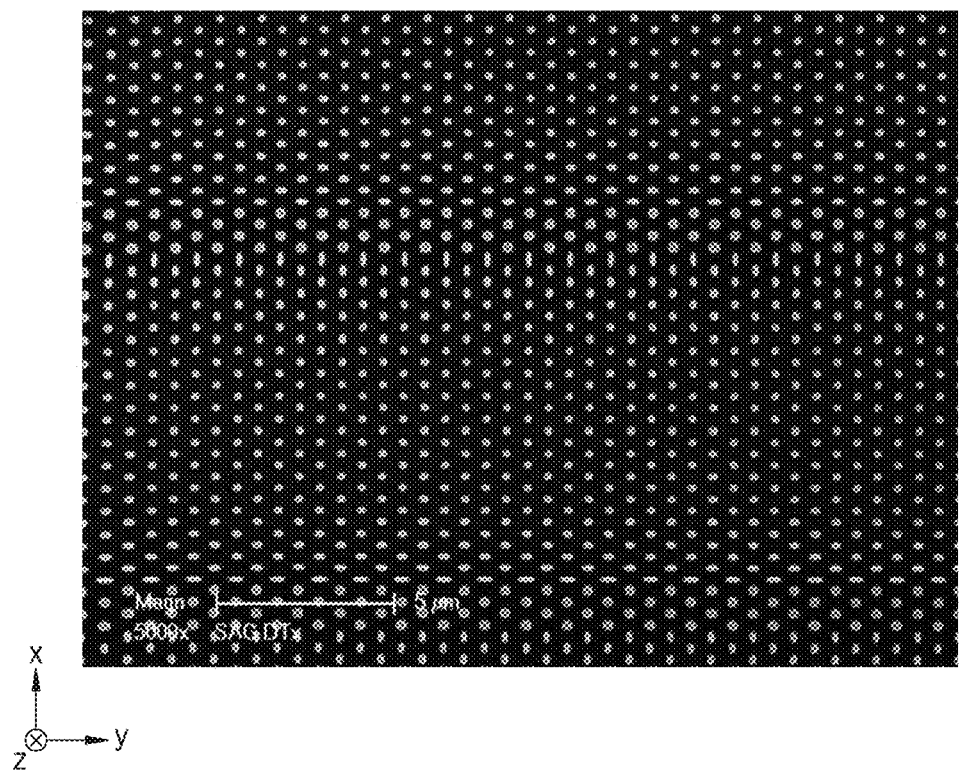
FIG. 13 is a view of a split metasurface according to an exemplary embodiment.
Figure 14:
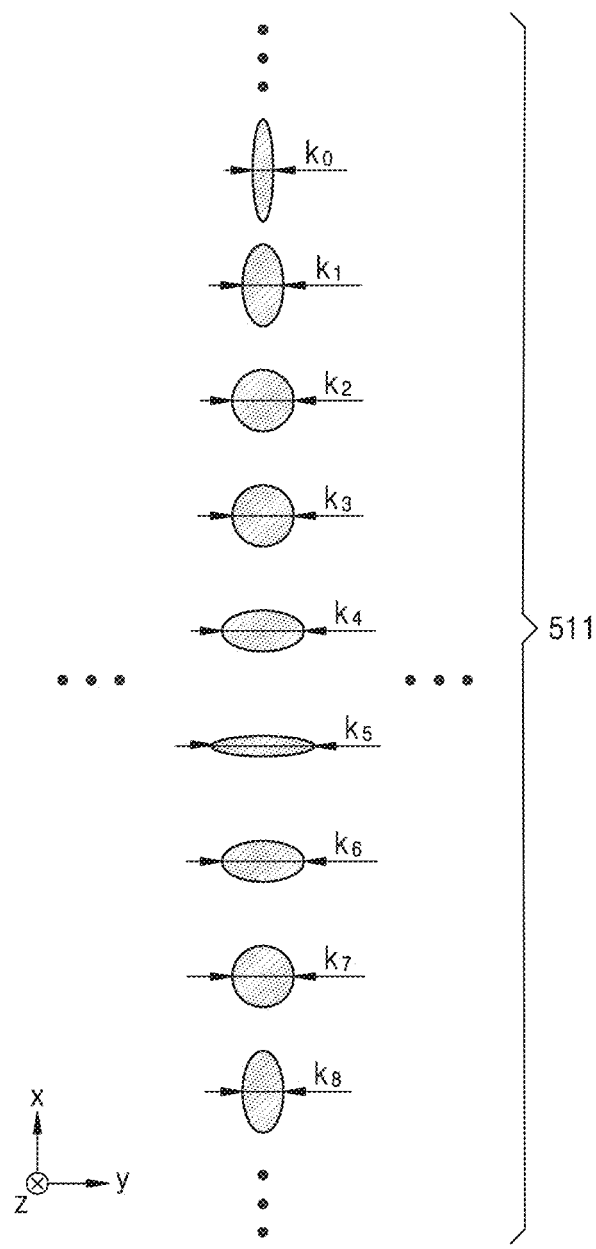
FIG. 14 is a view of a nanostructure pattern of the split metasurface of FIG. 13.

FIG. 13 is a view of a split metasurface 511 according to an exemplary embodiment. FIG. 14 is a view of a nanostructure pattern of the split metasurface 511 of FIG. 13.

Referring to FIGS. 13 and 14, the split metasurface 511 may include a pattern including a plurality of nanostructures arranged such that diameters of the plurality of nanostructures increase and then decrease in an x axis direction, and the pattern may be cyclically repeated in the x axis direction and a y axis direction. Each of the diameters of the plurality of nanostructures in the x axis direction and the diameters of the plurality of nanostructures in the y axis direction may increase or decrease, and each of the plurality of nanostructures may control light in different polarization states due to a diameter difference. Thus, the light is reflected, diffracted, and emitted in opposite directions. For example, when the diameters or dimensions of cross-sections of the nanostructures in the y axis direction are $k_0$, $k_1$, $k_2$, $k_3$, $k_4$, $k_5$, $k_6$, $k_7$, and $k_8$, the diameters or dimensions $k_0$ to $k_5$ may gradually increase, and the diameters or dimensions $k_6$ to $k_8$ may gradually decrease.

The split metasurface 511 may reflect light by splitting the light into first polarization light 810 and second polarization light 812 based on polarization. For example, the first polarization light 810 may be reflected in a +x axis direction and the second polarization light 812 may be reflected in a −x axis direction.

The spectrometers 100 to 500 according to an exemplary embodiment may include the metasurface which may replace various optical elements, such as a convex lens, a concave lens, a prism, a beam polarizer, etc. The metasurface may include a plurality of nanostructures that are two-dimensionally arranged.

The spectrometers 100 to 500 according to an exemplary embodiment include the metasurface that is relatively smaller than the optical elements, and thus, the spectrometers 100 to 500 may have reduced volumes.

For example, the spectrometers 100 to 500 according to an exemplary embodiment may have a length of the optical path, which is relatively great with respect to the volumes of the spectrometers 100 to 500, to thus have an improved spectrum performance.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A spectrometer comprising:
   a transparent substrate comprising a first surface and a second surface that face each other and are substantially parallel to each other;
   a slit provided on the first surface and through which light is incident onto the transparent substrate;
   a spectrum optical system comprising at least one metasurface comprising a plurality of nanostructures that are two-dimensionally arranged and satisfy a sub-wavelength scattering condition, wherein the at least one metasurface comprises:
      a focusing metasurface which includes first nanostructures of the plurality of nanostructures, and is configured to reflect, disperse, and focus the light incident thereon through the slit, at different angles based on respective wavelengths, the focusing metasurface provided on the first surface or the second surface;
      a collimating metasurface provided on the same surface as the focusing metasurface; and
      a grating metasurface provided on a surface opposite to the focusing metasurface; and
      an aberration control metasurface provided on the surface opposite to the focusing metasurface; and
   a sensor configured to receive the light from the focusing metasurface,
   wherein an optical path from the slit to the sensor comprises a path from the slit, to the collimating metasurface, to the grating metasurface, to the focusing metasurface, to the aberration control metasurface, and to the sensor, and
   wherein, when L is a total length of the optical path and D is a thickness of the transparent substrate, L and D satisfy the following inequality:

$L/D > 3$.

2. The spectrometer of claim 1, wherein the collimating metasurface comprises second nanostructures of the plurality of nanostructures, the second nanostructures being two-dimensionally arranged to have a collimating function.

3. The spectrometer of claim 2, wherein the collimating metasurface is located on the optical path between the slit and the focusing metasurface.

4. The spectrometer of claim 2, wherein the grating metasurface comprises third nanostructures of the plurality of nanostructures, the third nanostructures being two-dimensionally arranged to have a chromatic dispersion function.

5. The spectrometer of claim 4, wherein the grating metasurface is located on the optical path between the collimating metasurface and the focusing metasurface.

6. The spectrometer of claim 4, wherein the grating metasurface and the sensor are provided on the first surface, and
   the collimating metasurface and the focusing metasurface are provided on the second surface.

7. The spectrometer of claim 5, wherein the grating metasurface, the collimating metasurface, the focusing metasurface, and the sensor are two-dimensionally arranged, as seen in a plan view parallel to the first surface and the second surface.

8. The spectrometer of claim 1,
   wherein the grating metasurface comprises a pattern comprising third nanostructures of the plurality of nanostructures, the third nanostructures being arranged apart from each other in a second direction, and
   wherein the pattern is cyclically repeated in a first direction perpendicular to the second direction.

9. The spectrometer of claim 1, wherein the spectrum optical system further comprises a surrounding structure which surrounds the plurality of nanostructures and comprises at least one among silicon dioxide (SiO2), a glass, and a polymer.

10. The spectrometer of claim 1, wherein the transparent substrate comprises at least one among silicon dioxide (SiO2), a glass, and a polymer.

11. The spectrometer of claim 1, wherein the plurality of nanostructures comprise at least one among crystalline silicon (c-Si), amorphous silicon (a-Si), poly silicon (p-Si), gallium phosphide (GaP), gallium arsenide (GaAs), silicon carbide (SiC), titanium dioxide (TiO2), silicon nitride (SiN), and gallium nitride (GaN).

12. The spectrometer of claim 11, wherein the first nanostructures include a material having a higher refractive index than a material of a surrounding structure.

13. The spectrometer of claim 1, wherein the focusing metasurface makes the focused light be incident onto different locations of the sensor based on the respective wavelengths, and wherein the focusing metasurface is disposed at the first surface or the second surface of the transparent substrate and the sensor is disposed at the second surface or the first surface of the transparent substrate, respectively.

\* \* \* \* \*